United States Patent [19]

Beard et al.

[11] 4,327,353

[45] Apr. 27, 1982

[54] SECURITY SYSTEM

[75] Inventors: George W. Beard, 145 West Canton St., Boston, Mass. 02118; James M. Mulvaney, Southborough, Mass.

[73] Assignee: George W. Beard, Boston, Mass.

[21] Appl. No.: 148,547

[22] Filed: May 9, 1980

Related U.S. Application Data

[63] Continuation of Ser. No. 883,891, Mar. 6, 1978.

[51] Int. Cl.³ .................. B60R 25/04; B60R 25/10
[52] U.S. Cl. .................................... 340/64; 180/287; 307/10 AT; 340/543; 361/172; 235/382
[58] Field of Search ................ 340/64, 543, 147 MD, 340/63; 307/10 AT; 180/287; 361/172

[56] References Cited

U.S. PATENT DOCUMENTS

| Re. 27,013 | 12/1970 | Hedin et al. | 361/172 X |
|---|---|---|---|
| 3,392,558 | 7/1968 | Hedin et al. | 340/543 X |
| 3,631,301 | 12/1971 | Goldman | 340/64 X |
| 3,639,906 | 2/1972 | Tritsch | 340/149 A |
| 3,649,961 | 3/1972 | Draper | 340/64 |
| 3,649,962 | 3/1972 | Bedard et al. | 340/64 |
| 3,673,569 | 6/1972 | Hedin et al. | 361/172 X |
| 3,714,628 | 1/1973 | Sloger | 340/64 |
| 3,717,866 | 2/1973 | Ehrlich | 340/543 X |
| 3,757,301 | 9/1973 | Regan et al. | 340/543 X |
| 3,781,804 | 12/1973 | Lederer, Jr. | 340/543 X |
| 3,851,314 | 11/1974 | Hedin | 340/147 MD |
| 3,876,884 | 4/1975 | Housman et al. | 340/64 X |

Primary Examiner—John W. Caldwell, Sr.
Assistant Examiner—Joseph E. Nowicki
Attorney, Agent, or Firm—Charles Hieken

[57] ABSTRACT

An electronic system is provided for use with motor vehicles, homes, offices, factories, or other applications where it is desired to control access and/or operation. The security system utilizes a coded electronic key, preferably in the form of a card, which is connected to a decoder for identification by composing the key code with a stored code. If the electronic key is properly matched to the decoder, the system is allowed to function without tripping alarms. The system includes monitoring devices, supervising cabling and various access points, such as doors, hoods, etc., which, if breached without the proper card in place, will trip an alarm. The system is deactivated with the proper key and the system includes appropriate delays to allow proper parties to move in and out of the secured vehicle, room, etc.

2 Claims, 8 Drawing Figures

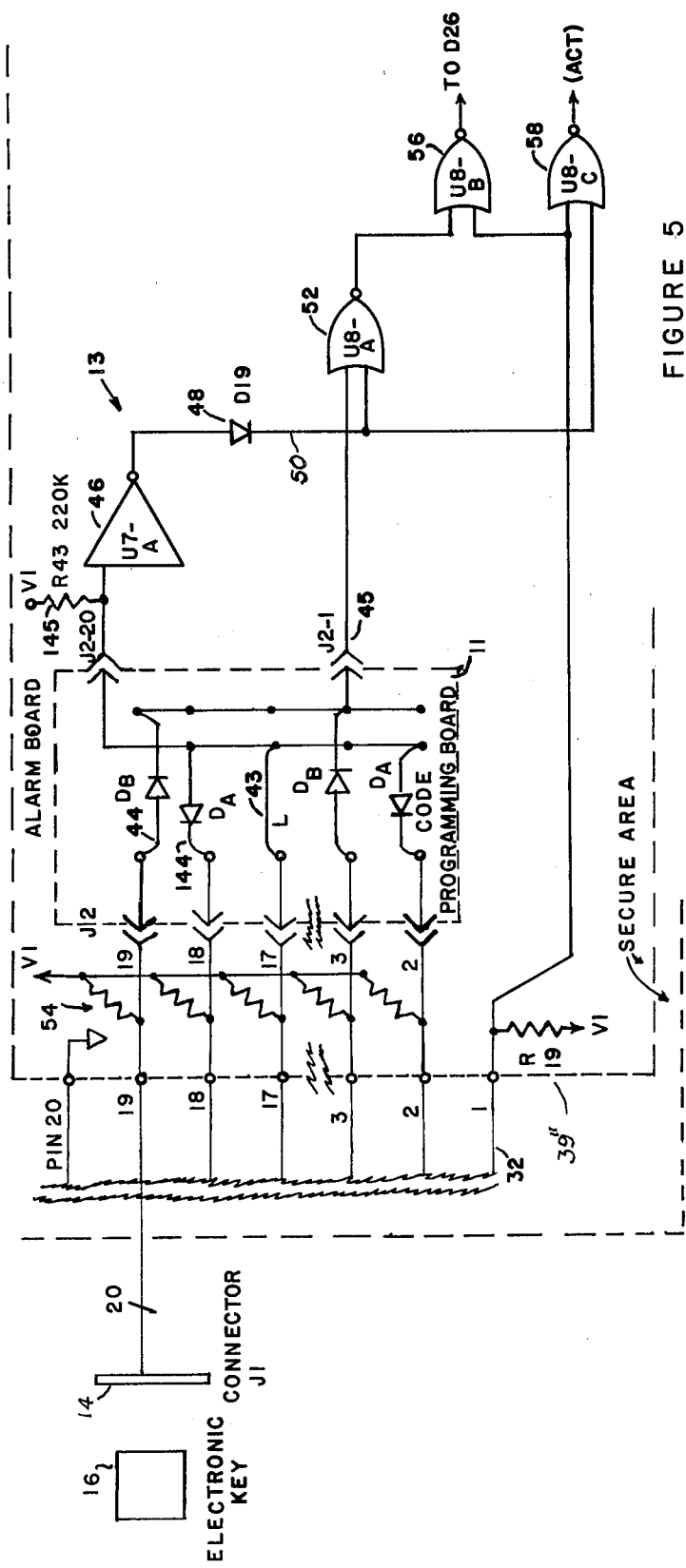

SECURITY SYSTEM

This is a continuation of application Ser. No. 883,891, filed Mar. 6, 1978.

BACKGROUND OF THE INVENTION

1. Field of the Invention

This invention relates generally to security systems and more particularly is directed towards a new and improved electronic security system for use on motor vehicles or at sites such as homes, offices, or the like.

2. Description of the Prior Art

Various types of security systems have been developed for use with motor vehicles, offices, homes, or the like, to prevent unauthorized entry and theft. Automobile security systems have included such mechanical devices as conventional door locks or steering wheel locks, either controlled by the ignition key or by a separate collar. Typically, present stand-alone deterrent systems provide by design some interface to authorized persons which can, in turn, be used by unauthorized persons to violate the system. Examples are wires and cables which can be accessed by using small portable tools and then shunted or otherwise manipulated. Devices that operate off locks, on the other hand, can be pulled, picked or deciphered. Door locks are easily defeated, and the ignition key-steering wheel locks can also be rendered inoperative by a professional thief. Separate steering wheel collars are somewhat awkward to install, are not easily stored, and provide no protection for the contents or extremities of the vehicle. More sophisticated electronic or electro-mechanical systems have been developed but these have not been entirely satisfactory from the standpoint of cost, effectiveness and operating convenience. For example, alarms that are armed by means of a mechanical fender lock or the original equipment ignition lock are defeated by the lock being punched or pulled out and a by-pass shunt or substitute lock cylinder inserted. The secret locations of kill switches that turn off ignition or gas line valves can be disclosed by service or dealer personnel. They also provide no protection for vehicle contents or extremities. Ignition cut-off and alarm systems are easily disconnected or shunted around unless located under a locked hood. Current hood locks, even those requiring both vehicle entry and a separate key, are easily defeated by shunting electric locks or pulling mechanical locks and cables. Alarm systems that are controlled by magnetic card devices that are actuated only by movement of the card cannot continuously monitor the presence of the card. This may cause the operator to forget and leave the card in place or to leave a machine on while unattended. A hard wired (unbuffered), coded ignition cut-off may be by-passed by opening the hood, or the code utilized is deciphered by testing electrical values of the pins in the connector circuit. Dialed or key pad coded systems are awkward and cause dangerous delays to users threatened with criminal attack.

Most systems of the foregoing type, if they use an alarm, normally result in the battery being run down if the alarm is tripped and not turned off manually. Alarm systems also fail if headlights are accidentally left on when the vehicle is vacated. Systems of the foregoing type also have lacked flexibility in providing for security not only of the vehicle itself but also of various access points, or accessories, extremities and contents and do not include other important security features such as manually-operated alarms for panic situations. Also, such systems are not readily adaptable to other applications such as providing security for and access to homes, offices, laboratories, copy machines, and the like.

Accordingly, it is an object of the present invention to provide a convenient alarm and control system which is readily adapted to either vehicle or building use and adapted to monitor a number of different access points and accessories. Another object of this invention is to provide a flexible, efficient security system which is virtually invulnerable to being defeated by one not in possession of an electronically coded device uniquely matched to the security system.

SUMMARY OF THE INVENTION

This invention features a security system useful on vehicles or at fixed sites, such as homes, offices, and the like, comprising a decoder/control module, a reader terminal connected thereto and a detachable electronic key uniquely coded to the arming circuit of the decoder terminal whereby the system can be disarmed only by connection of the proper electronic key via the reader terminal and cable to the proper corresponding decoder control. The decoder/control is located inside a secured area and completely controls access thereto. Various monitoring devices are connected to the decoder/control module and to various access points or protected equipment with alarms, which may be both visible and audible, that are actuated upon stress, or vibration, or wave deflection, or by any attempt to force any point of access, or by the use of an improper electronic key. The system prevents ignition or otherwise controls operation. The system includes delay functions for allowing drivers to get in and out of a vehicle and to open and close the trunk. The system resides in a secured area and completely controls access locks thereto. The system monitors exit from a vehicle or one or more areas, allowing an unrestricted amount of time to exit and lock up. Then, if desired and after appropriate delay, it warns if headlights (or, optionally, parking lights or other energy using device) has been inadvertently left on. A timing control is also provided for the alarm so as not to run down the battery for the system. A panic button is located proximate to the driver's seat so that an occupant can trip the alarm manually, if desired, in a personal emergency even if the electronic key is not inserted and without disabling the vehicle.

BRIEF DESCRIPTION OF THE DRAWINGS

FIG. 5 is a diagram showing details of the code reprogramming board and its interface to the decoder module alarm board.

DETAILED DESCRIPTION OF THE PREFERRED EMBODIMENTS

Figure 6:
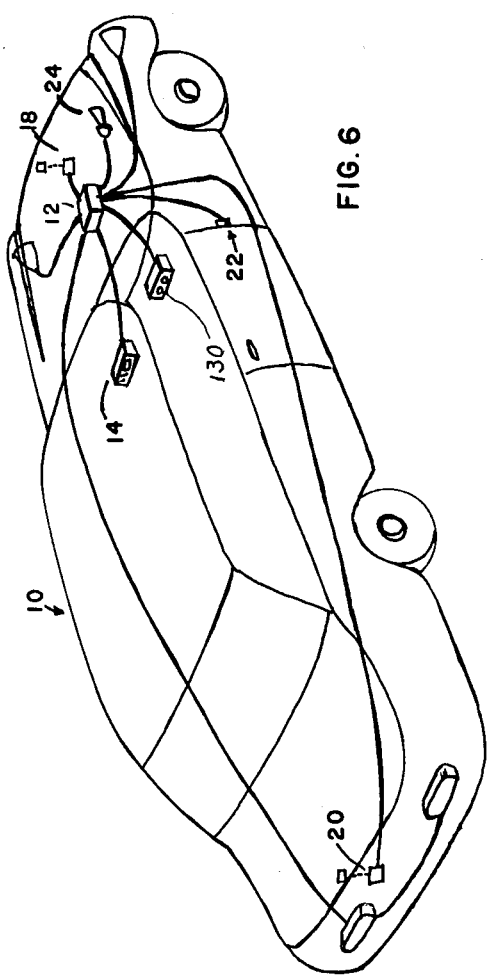
FIG. 6 is a view in perspective, somewhat schematic, showing a typical installation of a system on a motor vehicle.

Referring now to the drawings and to FIG. 6 in particular, there is illustrated a security system made according to the invention as embodied in a motor vehicle such as an automobile 10. The security system is generally organized about a control module 12, preferably mounted within the secured engine compartment, with a reader terminal 14 conveniently located within the driver's compartment, typically below the dashboard, and adapted to receive an electronic key 16 normally carried by the driver. The control module 12 is operatively connected to various access points, such as the hood, trunk and doors, with the hood lock of the vehicle provided with a solenoid-operated lock 18, while the trunk lid is controlled by a solenoid-operated lock 20. Voltage or current sensors 22 are connected at each door or on a courtesy light circuit to sense the opening and closing of doors. The module 12 also connects to an audio alarm, such as the car's horn 24, or a siren, usually may be provided within the secured area. The module also connects to the car's lighting system to provide visible alarm signals which are synchronized to the pulsations of the audible alarm. A prompt alarm circuit optionally monitors for headlights and/or parking lights on after exit as a means of protecting system power.

Figure 8:
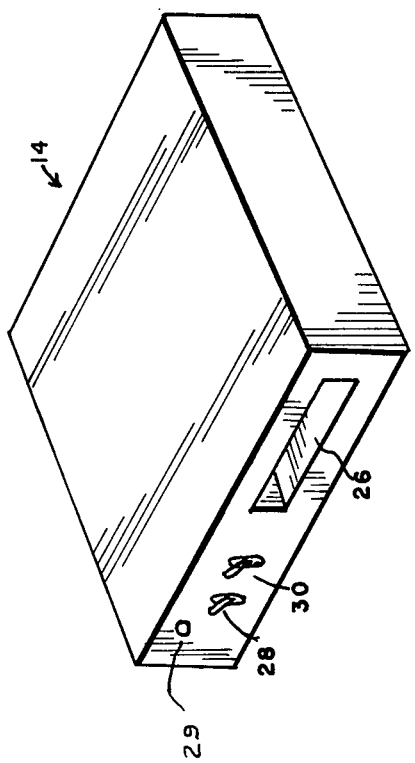

The reader terminal 14, as shown in FIG. 8, typically is a generally rectangular, box-shaped housing formed with a tapered slot socket 26 in the front thereof to receive the electronic key 16 which preferably is in the size and general shape of a credit card so that it may be carried conveniently on the person. The terminal 14 also includes a hood release switch 28 with actuation indicator light 29, a panic switch 30 by means of which the operator may trip the alarm manually in the event of an emergency, and an optional switch to desensitize motion sensors to avoid false alarms in certain circumstances.

The reader terminal 14, since it is installed within the passenger compartment of the vehicle, is provided with connector pins at the inner end of the socket 26 while the decoding circuitry associated with the pins is included in the control module 12 in the secured area of the engine compartment.

The security system is controlled by means of the electronic key 16 which the operator inserts in the slot 26 of the reader terminal 14 upon entering, or prior to entering, if the door lock is actuated by the control module. The electronic key 16 essentially is a printed circuit board having coded connections which are matched to corresponding coded pins 32, located at the inner end of the slot and connectable to the coded connections on the electronic key.

Figure 7:
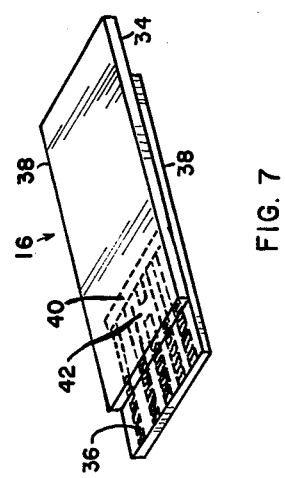
FIG. 7 is a view in perspective showing a preferred embodiment of the electronic key, and, FIG. 8 is a view in perspective showing a preferred embodiment of the reader terminal for vehicles made according to the invention.

The key 16, as shown in FIG. 7, is a laminated structure comprised of a center ply 34 of fiberglass, or the like, on at least one end of which is printed a group of parallel spaced fingerlike contacts 36 which are electrically conductive and which extend in under an outer ply 38 of a suitable opaque material displaying the key registration number and other information. The outer plies 38 do not extend the full length of the center ply 34 but rather terminate a short distance from the end on at least one side of one end in order to expose a portion of the contacts 36. The contacts 36 extend in under each opaque top ply 38 and, initially are all connected to a common cross lead 40. One or more of the contacts 36 is broken by grinding or drilling under program control, or the like, as at 42, in the predetermined and registered coding pattern. The break in the leads 36 is obscured by the upper ply 38 so that the coding pattern is not visible. The same coding pattern may be repeated on the opposite end and/or reverse side of the key, so that the key may be inserted in either direction or to provide full redundancy of connection. The card provides a rugged and simple circuit utilizing metal-to-metal contact with the reader to insure a positive engagement with the decoding unit. The card cannot be rendered ineffective by demagnetizing and there are no magnets that might be shifted about. Since the card does not utilize capacitance, it will not fail if it becomes wet.

Figure 1:
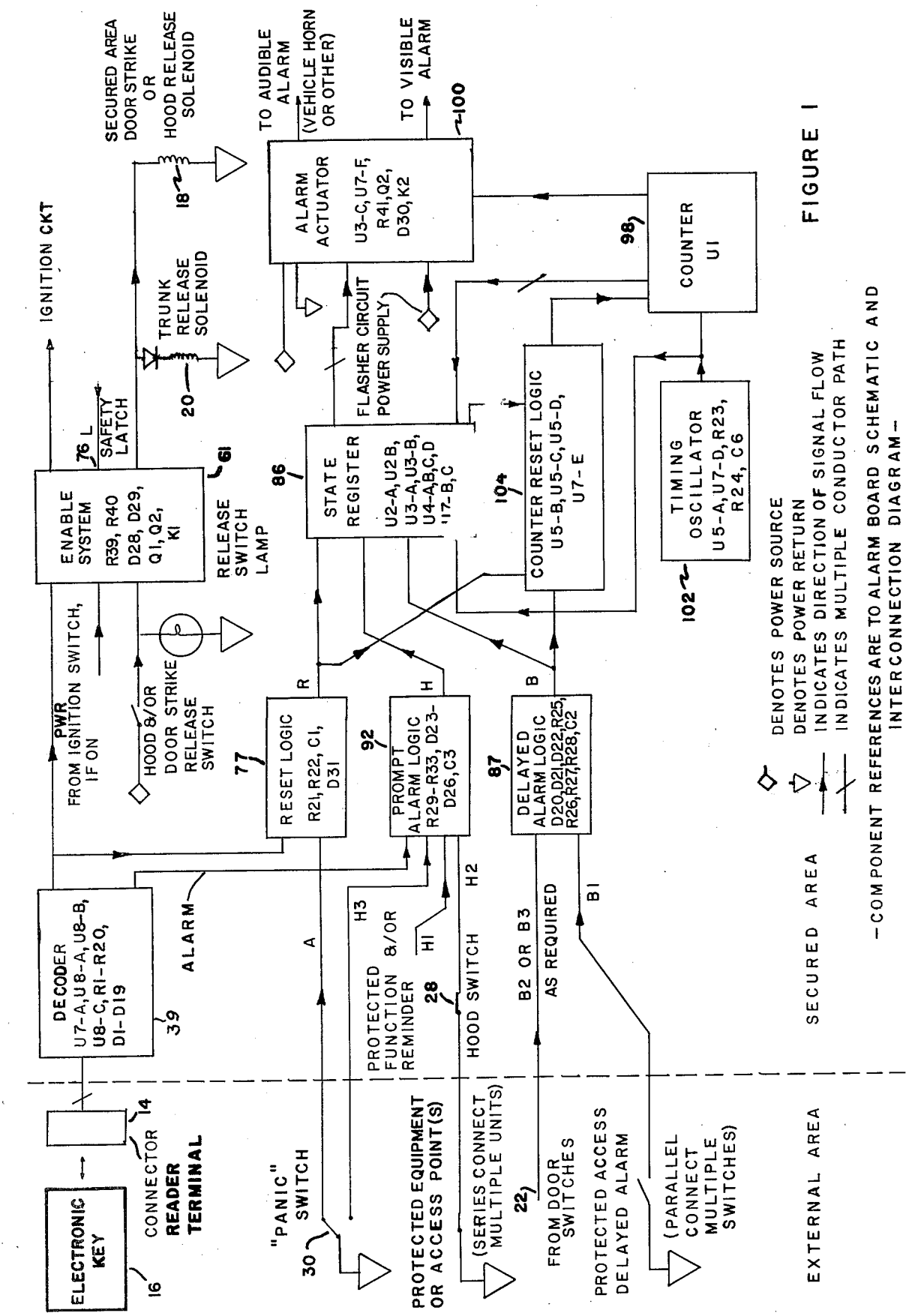
FIG. 1 is a block diagram of the security system made according to the invention and as embodied in a motor vehicle.
Figure 2:
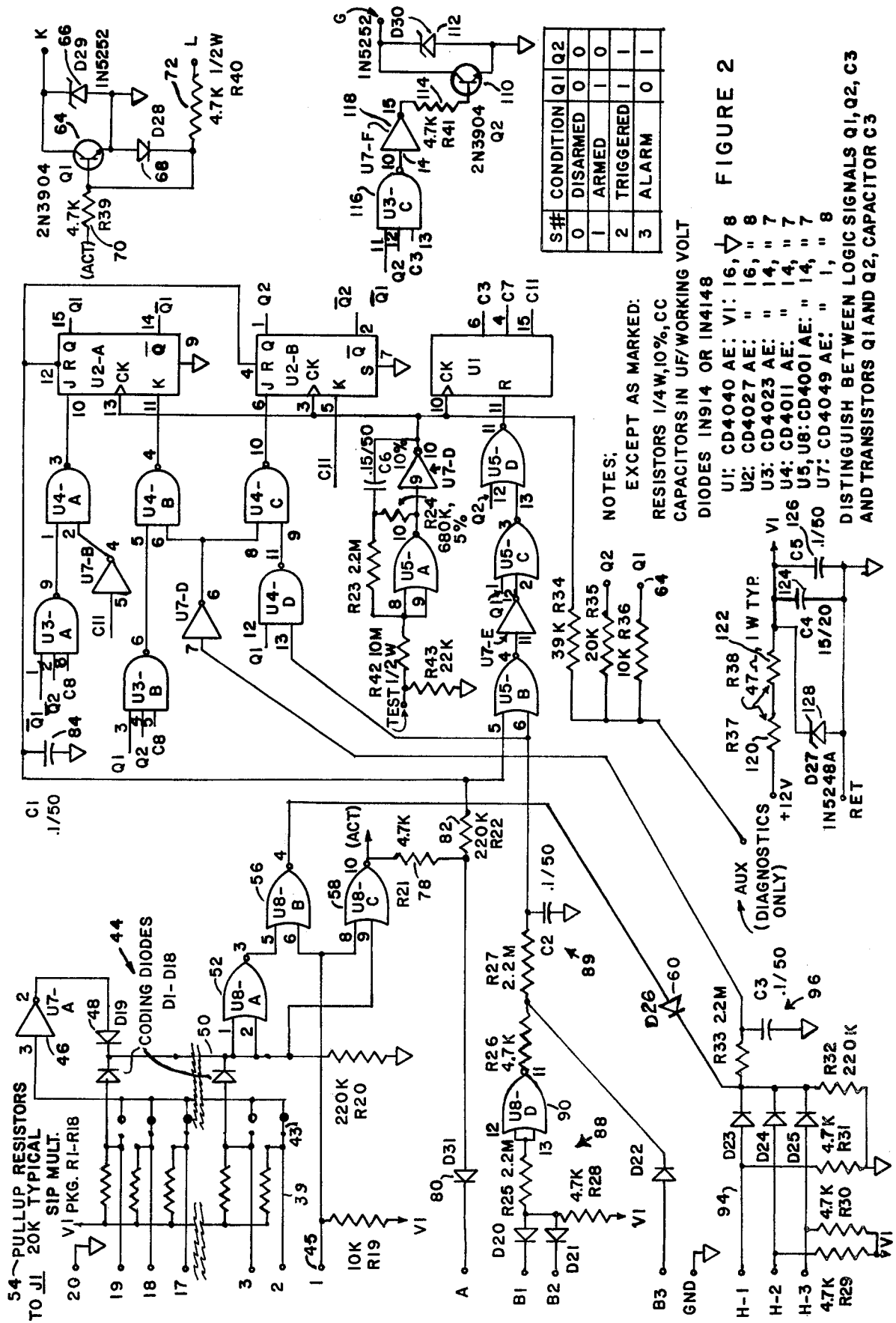
FIG. 2 is a logic diagram of the system.
Figure 3:
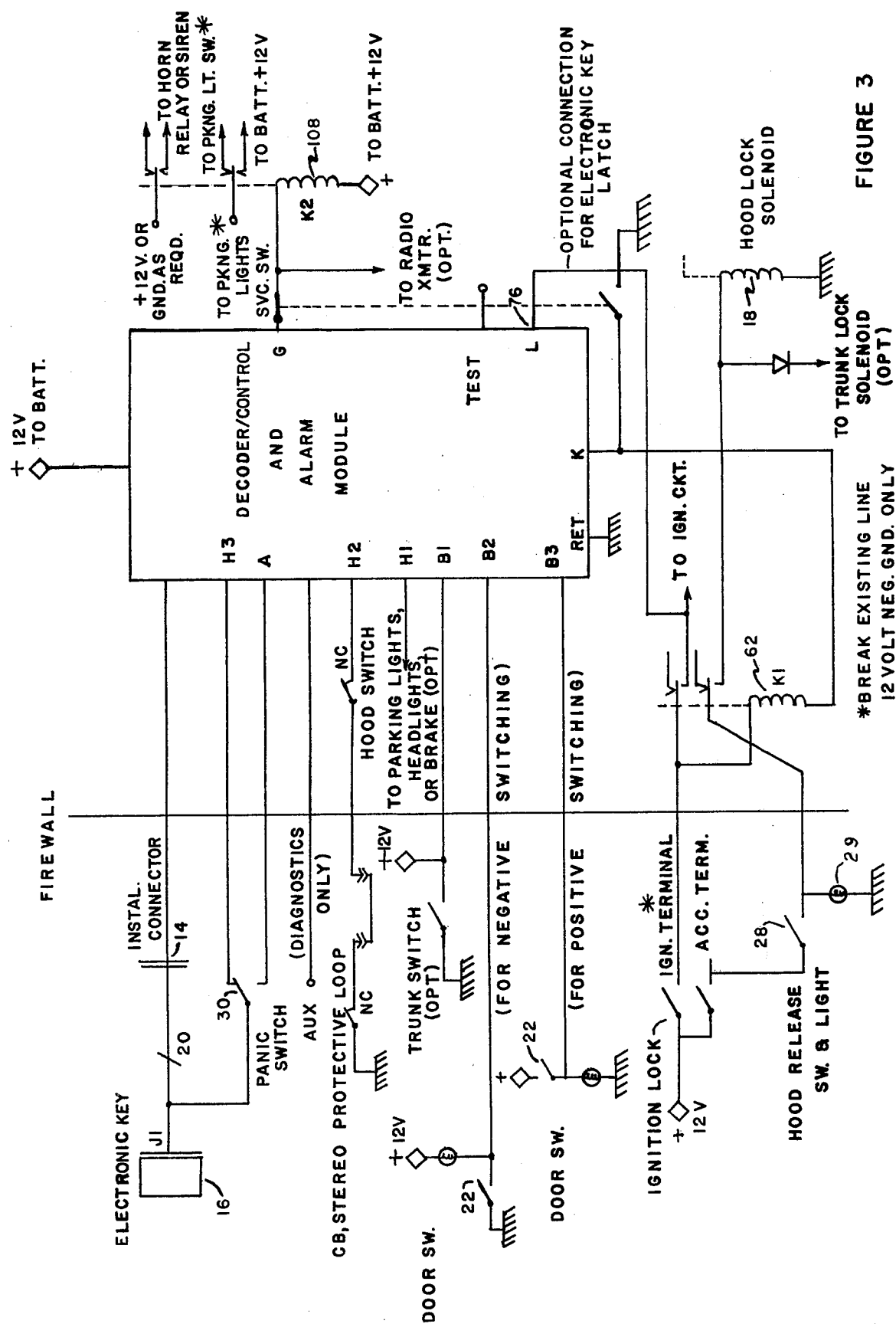
FIG. 3 is a schematic diagram showing the connections between the alarm (decoder/control) module and the various functional elements operatively associated therewith.

In practice, each key 16 has a unique code which is matched to a corresponding decoder circuit 39 in the control module 12 and each key may be identified by a common and unique serial number so that the key may be replaced if lost through a registration system established by the manufacturer. Periodically, a non-obvious algorithm may be associated with each serial number so as to produce an eighteen bit binary coding string containing at least four zeros and at least four ones for devices employing twenty pins. For devices employing other than twenty pins, the number of bits in the coding string is two less than the number of pins. The coding links are the conductive leads 36 printed onto the key. The links 36 are left intact or opened in accordance with the relationship of the ones and zeros of the eighteen bit code to corresponding positions on the card. These links have been connected to decoder pins 32 numbered 2 through 19 in FIG. 5. To prevent false alarms during card insertion, a pin (1) at or near one end of the key is always connected to a pin at or near the opposite end. One of these connects to a reference voltage and the other to card sense circuitry in the decoder 39 (FIG. 1). For each one bit (the corresponding coding link 36 on the card having been left intact) the corresponding link in the decoder 39 is opened and a corresponding diode 44 is inserted into the alarm board (FIG. 2). Inputs to the alarm board (FIG. 5) from the reader terminal connector 14 which are unused are treated as zero bits. This permits a variety of different length connectors of various spacings between pins, thereby adding greatly to the number of unique key/code combinations yet requiring minimal additional tooling, labor and components.

While the key has been shown in the form of a flat card, other configurations may also be used. For example, the key could be configured as a cylinder much like a pen with appropriate rails embedded lengthwise in the cylinder to contact a pin at the end of the socket. Annular contacts could be provided along the shank of the cylindrical key. Selected ones of the annular contacts would be complete while others would be open to form a coded pattern in the same fashion as in the principal embodiment.

For an open coding connection on the key 16 (FIG. 7) the corresponding coding link in the decoder circuit 39 is closed by the insertion of a jumper wire 43 (FIG. 2) and the corresponding diode 44 is not inserted. For a closed coding connection on the key 16, the corresponding coding link (jumper wire) on the alarm board is omitted (open circuit) and the corresponding coding diode 44 is inserted. Hence, the insertion of an improper electronic key card 16 having a closed coding connection for a pin having a corresponding alarm board coding link, will produce a low logic input to an inverter gate 46; hence through diode 48, a high level on an error line 50, which provides high input to gate 52. Also, insertion of an improper key having no connection for a pin having a corresponding diode produces, through a pull-up resistor 54 and coding diode 44, a high logic level on the error line 50. The physical insertion of a key is sensed by the occurrence of a pin near the end 45 going to a low level. Integrated circuit logic elements 52, 56 and 58 combine the sense and error line signals to produce (1) a prompt alarm input via diode 60, for key insertion and error line high, or (2) an actuate (ACT) signal to the ignition and hood release enable, and to the reset logic, for key insertion and error line low.

The decoder coding links 43 and diodes may be inserted on a separate code programming board 11 as in FIG. 5. Fixed site systems may be reprogrammed guidely by replacing the code programming board with one having a new code.

The control module 12 includes an ignition and hood release enable system 61, as shown in FIG. 1, which is comprised of a relay 62, a driver transistor 64, protection diodes 66 and 68, and input resistors 70 and 72. Closure of the relay 62 connects the hood release solenoid 18 to its control switch 28 and applies power to the ignition system on the vehicle. A safety latch input 76 holds the relay 62 on until ignition power is removed, thereby preventing ignition failure due to the removal of the electronic key 16 while driving or if in a fixed site application, permitting the use of one key to gain passage through a series of doors and sensors.

A reset logic system 77, also in the module 12, is comprised of a resistor 78, a diode 80, a resistor 82, and a capacitor 84, and performs a positive logic AND of ACT and input A and low pass filters thus result. Its output R drives an override input of a state register 86, resetting it to $S\phi$, the disarmed state. ACT activates the relay 62. The filter is intended to prevent spurious actuation either by electrical transients arising elsewhere or by rapid switching of the decoder inputs in an attempt to electronically pick the lock.

A delayed alarm logic system 87 is comprised of a resistor-diode OR circuit 88 followed by a transient suppression low pass filter 89 to the output B. Two inputs in, B1 and B2, are low active inputs, the third is high active; inversion for the first two is provided by a gate 90. Availability of both senses of input permits the use of all existing vehicle door light switches, whichever signal polarity they may provide, and simplifies installation.

A prompt alarm logic system 92 is a resistor-diode OR circuit 94, active high, followed by a transient suppression filter 96 to the output H. The inputs differ in having pull-up or pull-down resistors as the expected input may be a voltage source or a contact opening.

A counter 98 provides timing signals to the state register 86. These timing signals include selectable entry delays of approximately 8, 16 or 32 seconds, separately selectable exit delays of 8, 16 or 32 seconds for the delayed alarm inputs B from the delayed alarm logic system 87, and an alarm reset signal to terminate the alarm and reset the control to the armed state after approximately four minutes of alarm output. The counter 98 also supplies an approximate ½ Hz modulating signal to an alarm actuator 100.

A timing oscillator 102 supplies an approximate 4 Hz clock input to the counter 98 and to the state register 86 for clocking the prompt and delayed logic signals. The state register 86 is adapted to assume one of four possible states; namely, disarmed ($S\phi$); armed (S1); triggered (S2) and alarm (S3). A reset input R forces ($S\phi$); insertion of the electronic key 16 produces this condition. In the disarmed state $S\phi$, in the absence of an alarm input (B or H), the counter 98 operates; the C8 output of the counter transfers the state register 86 to the armed condition S1. Upon entering the armed state S1, the counter 98 is reset via counter reset logic 104. In state S1, input of a delayed alarm signal B will transfer the state register 86 to the triggered state S2, allowing the counter 98 to run. An output of the counter 98, again C8, for example, transfers the state register 86 to the alarm state S3. The alarm state S3 enables an alarm actuator 100. Another timing signal C11 transfers the state register 86 to the armed state S1, terminating the alarm output.

In any state, assuming a reset signal R is absent, a prompt alarm H input will transfer the state register 86 to the alarm state S3.

The panel switch 28 which actuates the hood release solenoid 18 also turns on the light 29 when the switch is closed in order to remind the operator of the current drain and the unlocked status. The switch 28 is ineffective when the electronic key 16 is removed from the terminal 14. The panic button 30 can be used with or without the electronic key 16 in place but shutting it off requires that the electronic key 16 be inserted.

A counter reset logic system 104 resets the counter 98 under the following three conditions: (1) R active; (2) armed state S1; and (3) disarmed state $S\phi$ and B active. The purpose of the last of these is to allow the operator to remove the electronic key 16, open the door, exit the vehicle, and access the trunk at leisure even though the trunk may be on a delayed alarm circuit. If the door is opened before the exit-delay interval of a selected time length expires, the counter 98 is reset. The timing restarts at the closure of all access points protected by delayed alarm.

The alarm actuator 100 includes a relay 108, a driver transistor 110, protective diode 112, a resistor 114, and logic elements 116 and 118. The state register 86 (S3) outputs are combined (logic AND) with the ½ Hz modulating signal C3 from the timer 102. Relay 108 contact closure applies power to an audible alarm, such as the horn 24 contained within the engine compartment which is a secured area. A separate siren or bell may also be used.

In the preferred embodiment, alarm power is taken from the power system of the vehicle, typically +12 volts and RET, through a filter comprised of resistors 120, 122, capacitor 124, 126 and diode 128. The preferred logic implementation for the system is complementary MOS. No specific spatial sequence of pins on J1 is required, but sense and ground should be near opposite ends of the connector or otherwise so arranged that during normal insertion and removal of the electronic key 16 the coding connections are not broken while the sense connection is completed.

The alarm circuits are protected against voltage and current transients and it is not possible to defeat the security system by burning out or removing a fuse since a fuse is not required, nor by overloading or shorting wires.

Figure 4:
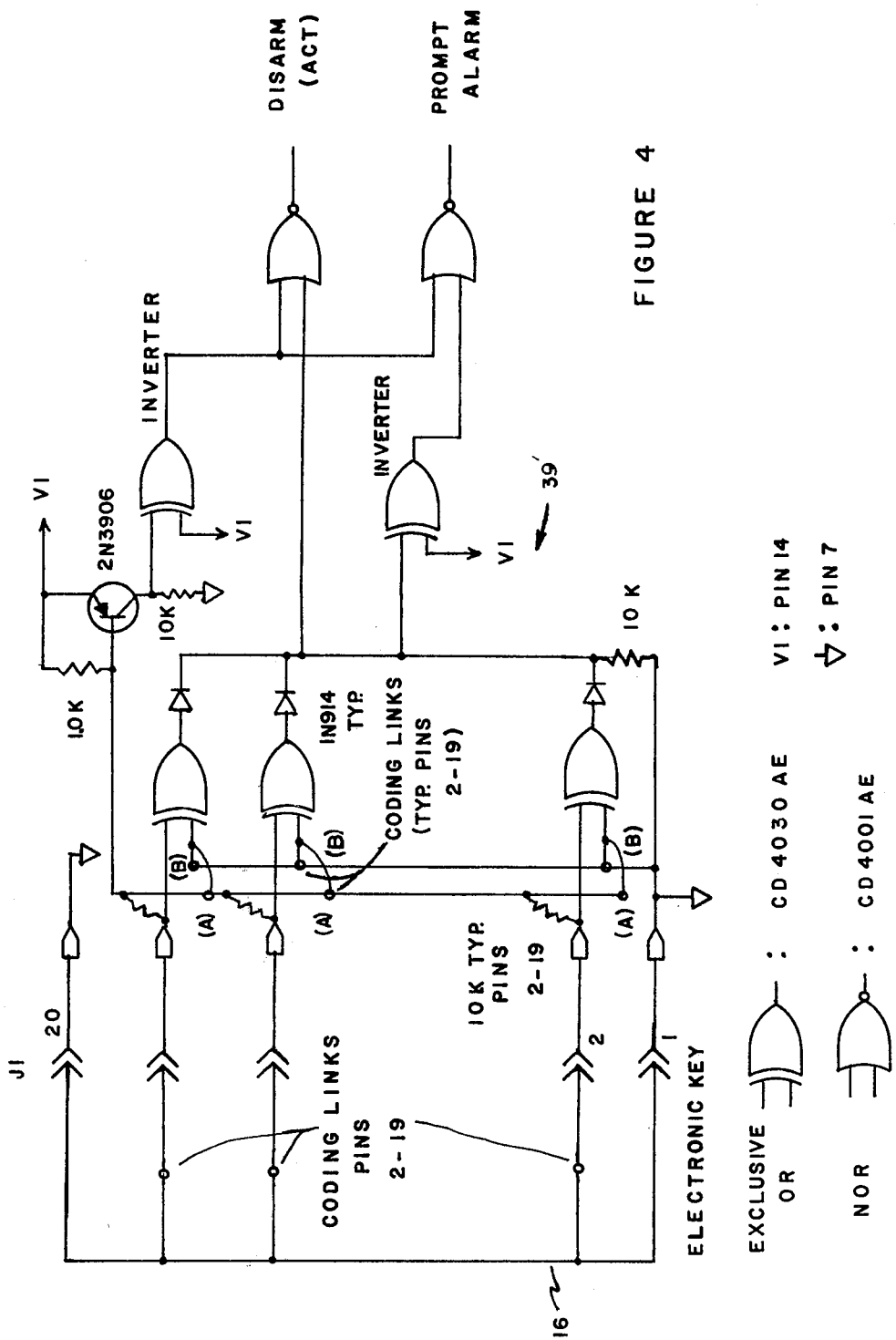
FIG. 4 is a circuit diagram of a modification of the decoder circuit.

Referring now to FIG. 4 of the drawings, there is illustrated a modification of the invention and in this embodiment there is provided a modified decoding circuit 39 adapted to even further prevent the system from being defeated by attempting to decode the connector and decoding circuits through input resistance measurements and also to increase the probability of detection of tampering with the circuit. In the FIG. 4 circuit, the impedance presented at the junction contact J1 is independent of the coding link position (A or B). Also, bringing any line, except J1-20, to a low level will perform the key sense function of the basic decoder circuit shown in FIG. 2 at J1-1. Thus, any attempt to pick the lock electronically by trial combinations would be promptly detected.

Referring now to FIG. 5 of the drawings, there is illustrated another method of hardening the decoding circuit 39 against electronic picking by replacing some or all coding links 43 with blocking diodes 144 applying voltage to these via resistor 145.

When the system is used in a vehicle, the operator will carry the electronic key on his person. Once the vehicle door is open, the operator has ample time in which to insert the key in the connector before the alarm is sounded. If an improper key is inserted, the alarm will be tripped. Likewise, if the key is not inserted within the provided delay, the alarm will be tripped. Any attempt to open the hood or trunk will also cause the alarm to be actuated unless the card is in place.

The system has great flexibility in that it allows the operator to open the hood, if desired, by flipping a switch near the driver, and since the control circuitry is located in a secured area within the engine compartment, it cannot be tampered with since the engine compartment is locked and cannot be breached without tripping the alarm. The delay functions allow ordinary utilization of doors and trunk, for example, by an authorized user, but effectively protects against unauthorized use.

The system can be provided with additional monitoring connections so that equipment within the vehicle can be protected. For example, monitoring switches can be connected to accessory items, such as a CB radio 130, tapedecks, glove compartment doors, and the like, and any tampering or attempted removal will cause the alarm to be actuated. In addition, other functional elements may be added to further secure the vehicle. For example, a motion detector may be included which will trip the alarm in the event that any unauthorized movement of the vehicle is attempted. Such motion detectors can be set to very sensitive levels so that any one striking the vehicle, as might occur when attempting to pry off a hub cap or break a window will cause the alarm to trip.

If the system is utilized to secure an office, apartment, or the like, the slot for the key would be located typically on the outside wall of the secured area near the door, and suitable wiring would connect through the wall into the enclosed area to operate the door lock enabling mechanism which connects to a cooperating control module within the secured area. Other control functions, such as monitoring switches at windows and other doors may be included to provide a burglar alarm system. Functional elements such as smoke or heat detectors and wireless transmitters may be added, if desired.

Having thus described the invention, what we claim and desire to obtain by Letters Patent of the United States is:

1. A security system for a lock-controlled unit, comprising
   (a) a reader connector having electrical contacts for connection with a cooperating electronic key,
   (b) an electronic key having a plurality of electrically conductive elements defining continuous and discontinuous circuits in a predetermined, uniquely coded arrangement,
   (c) a decoder operatively connected to said reader connector and having logical circuitry responsive to said electronic key seated in said reader connector and coding links and diodes connected to said contacts of said connector in a predetermined, uniquely coded arrangement complementary to the coded arrangement on said key whereby an error signal is generated upon connection of a differently coded key to said connector and an enable signal is generated only upon connection of a similarly coded key to said connector,
   (d) alarm means operatively associated with said system,
   (e) alarm control means operatively connected to said alarm means and to said decoder and responsive to the signals from said decoder whereby said alarm means is actuated by an error signal from said decoder, and,
   (f) lock control means operatively connected to said alarm control means for enabling and disabling said lock and responsive to the signals from said decoder,
      said key having said conductive elements in the form of spaced parallel strips including a first conducting strip and a second conductive strip and a common transverse strip for engagement with first and second ones of said contacts when said electronic key is seated in said reader connector,
      said first and second strips being conductively interconnected by said common transverse strip so that upon mating engagement with said first and second contacts said first and second strips are in a conductive path carrying an input signal to said logical circuitry indicating that said electronic key is seated in said reader connector and comprising means for preventing false error signals during insertion of said electronic key into said reader connector,
      said logical circuitry responsive to said input signal for enabling said decoder to provide the appropriate one of said error and enable signals.

2. A security system, according to claim 1, wherein said key is in the form of a cylinder and said conductive elements are in the form of a spaced annular member disposed coaxially along the cylinder and a common lead connecting all of said members.

* * * * *